Figure 1:
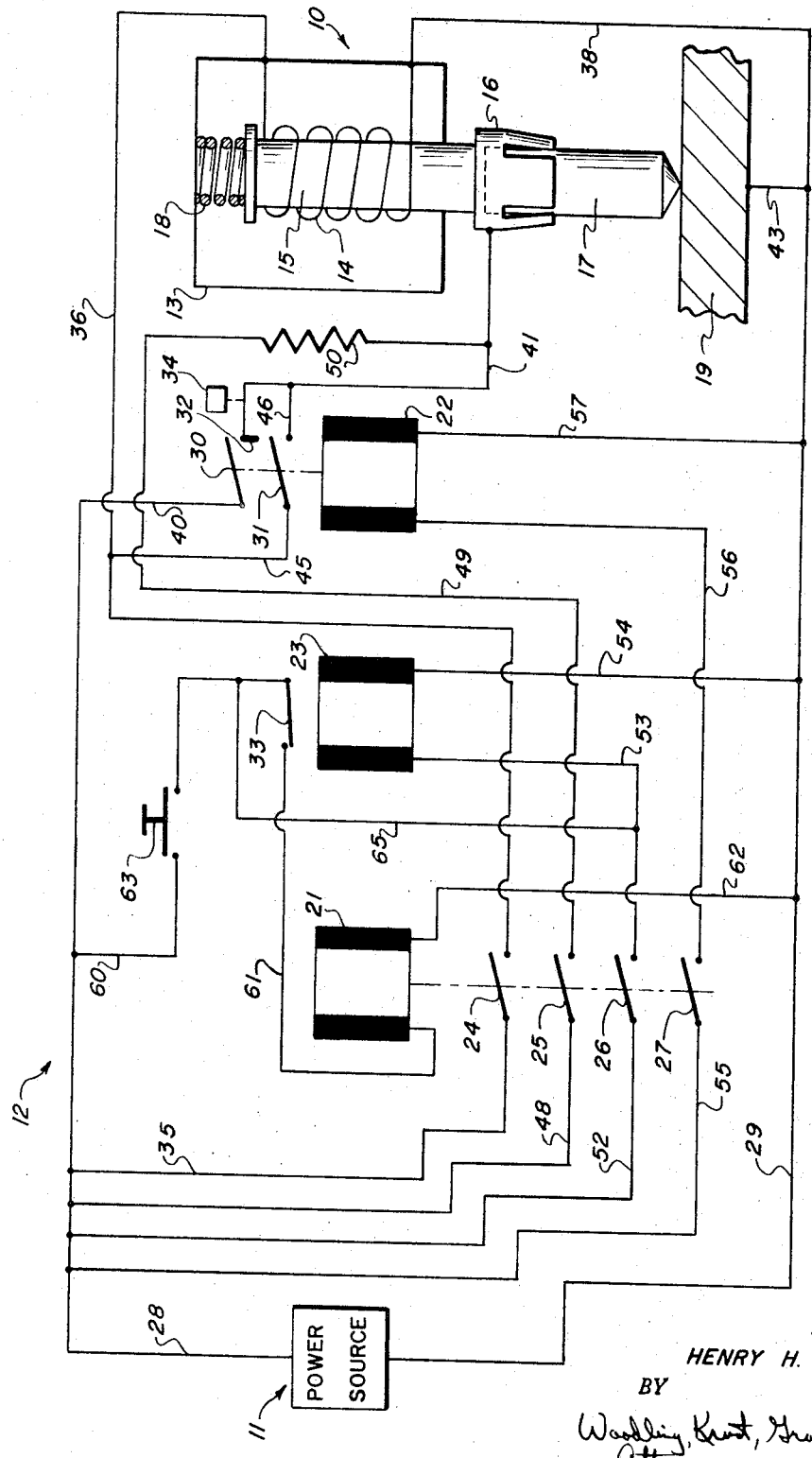

INVENTOR.
HENRY H. JENKINS

INVENTOR.
HENRY H. JENKINS
BY
Woodling, Kost, Granger + Rust
attys.

United States Patent Office 3,346,715
Patented Oct. 10, 1967

3,346,715
ELECTRICAL CONTROL SYSTEM FOR STUD WELDING
Henry H. Jenkins, 615 Westlake Drive, Amherst, Ohio 44001
Filed June 6, 1963, Ser. No. 291,595
15 Claims. (Cl. 219—98)

This application is a continuation-in-part application of United States Ser. No. 154,618 filed Nov. 24, 1961, now abandoned.

The present invention relates in general to welding apparatus and more particularly to an electrical control system which acts between a power source and a stud welding gun or similar mechanism in order to accomplish the end result of welding a metal member to a metal workpiece.

An object of the present invention is to provide an electrical control circuit for stud welding which is more reliable and efficient in operation than such circuits heretofore proposed.

Another object of the present invention is to provide an electrical control circuit for stud welding which includes a single coil in combination with a main welding contactor and an interlock switch which are moved by the same power source with a mechanical adjustment means which adjusts within limits the relative make and break conditions of the main welding contactor and the interlock switch to permit either plunging of the stud only after the main weld current has stopped or to stop the main weld current only after the stud has plunged or a plurality of conditions which exist between these extremes.

Another object of the present invention is to provide an electrical circuit in combination with only a single coil of a welding gun or similar device which prohibits the de-energization of the coil until the main welding current has been turned off.

Another object of the present invention is to provide an electrical welding control unit which if desired assures the plunging of a weld stud only after the main welding current has been shut off.

Another object of the present invention is to provide an electrical stud welding control which may assure that a stud will not be urged into engagement with a surface to which it is to be connected during the welding process until the main weld current is shut off, by the use of a single coil and a main weld contactor mechanically connected to an interlock switch which is in series with the single coil.

Another object of the present invention is to provide an electrical control circuit for stud welding which includes a single coil in combination with a main welding contactor and an electrical means which permits either plunging of the stud only after the main weld current has stopped or to stop the main weld current after the stud has plunged.

Another object of the present invention is to provide both an electrical as well as a mechanical means of controlling the plunging of a stud with respect to the closing of the main welding contact.

Figure 2:
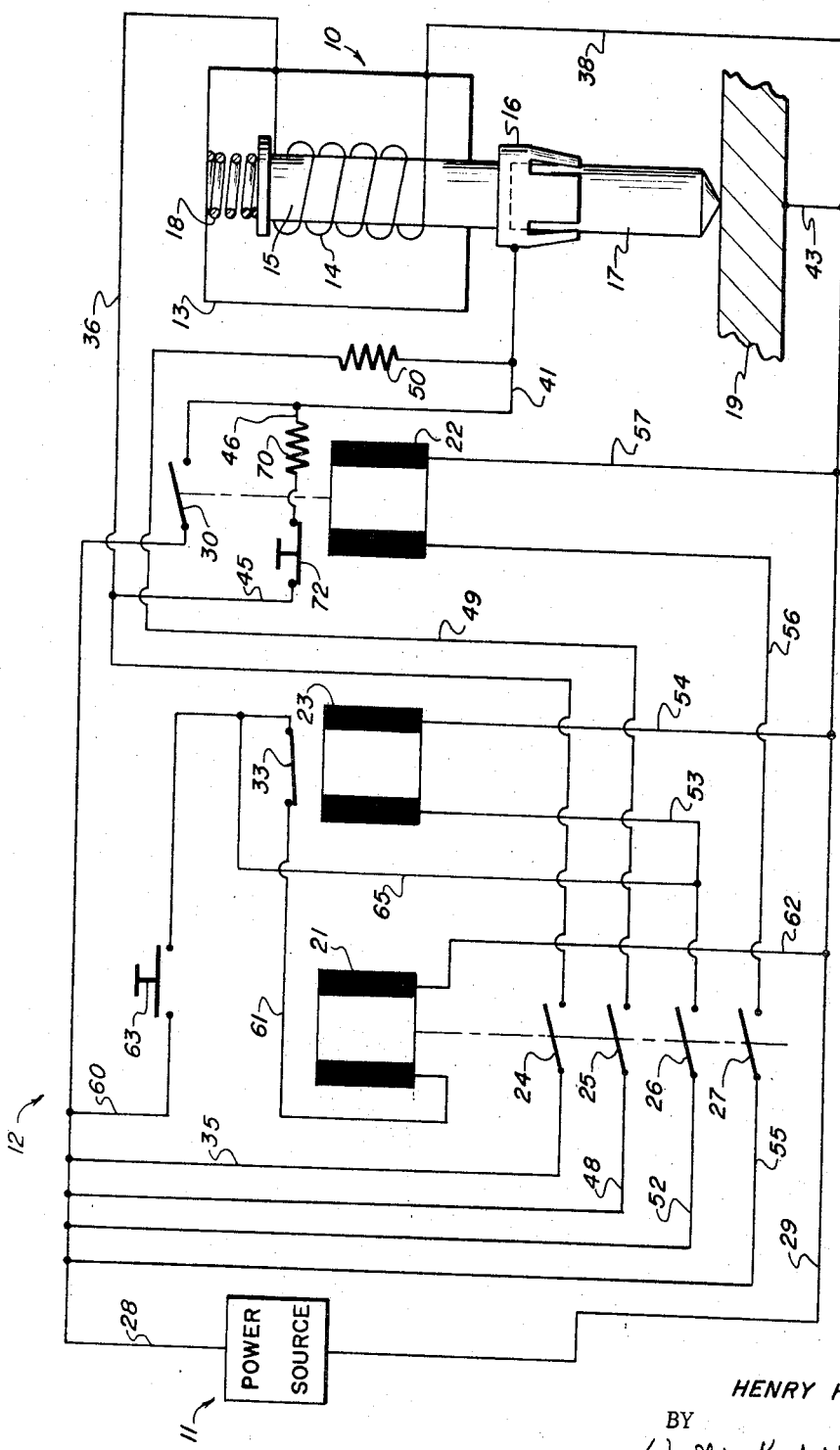

Other objects and a fuller understanding of this invention may be had by referring to the following description and claims, taken in conjunction with the accompanying drawings, in which:

FIGURE 1 is a representation of a welding gun or similar device and welding power source as interconnected by an electrical control circuit 12; and FIGURE 2 is a view similar to FIGURE 1 but showing a modification of the present invention.

Referring to FIGURE 1, the apparatus illustrated therein includes generally a welding gun 10, a power source 11, with these two being interconnected by an electrical control circuit 12.

The welding gun or similar device which might, for the sake of example, be a mechanism which is adapted to weld a plurality of stud members as distinguished from a single stud member includes a housing 13 which has therein a coil 14 with an armature 15 adapted to be surrounded by the coil and moved between first and second positions upon energization and de-energization of the coil. The armature as illustrated extends from the housing, and secured thereto is a chuck member 16 which is adapted to hold a stud 17. A spring 18 is interposed between the end of the armature and the housing and serves to constantly urge the chuck and consequently the stud 17 which is carried thereby into engagement with a workpiece 19 to which it is to be subsequently welded. Energization of the coil causes the armature and as a result, the stud to move upwardly as seen in FIGURE 1 and a potential between the stud and workpiece causes an arc which produces the heat to melt both the end portion of the stud and the adjacent portion of the workpiece so that when the stud is urged back into engagement with the workpiece by the spring 18, upon de-energization of the coil, the stud and workpiece will be fused together. The general construction of welding guns or similar devices is known by those skilled in the art and a further discussion of the details of construction will not be discussed herein.

The power source 11 may be any suitable commercial source of power which will provide sufficient direct current to provide enough energy to make molten the end of the stud adjacent the workpiece and also that portion of the workpiece, so that upon shutting off the power source and bringing the stud back into engagement with the workpiece will result in a fusing together of these two members. As indicated, conductors 28 and 29 serve to carry the power on opposed sides of the power source.

The electrical control circuit 12 includes in general first and second relays 21 and 22 and a time delay relay 23. Four switches numbered 24, 25, 26 and 27 respectively which are normally open switches are adapted to be simultaneously closed upon energization of the relay 21 and upon de-energization of the same these switches move to the open position. The dot-dash line indicates these switches are mechanically connected together. A main welding contact 30 and an interlock switch 31 which are both normally open are adapted to be simultaneously closed upon energization of relay 22 and upon de-energization of the same both the welding contact 30 and the interlock switch 31 are adapted to open. The dot-dash line indicates these elements 30 and 31 are mechanically connected together. A mechanical adjustment means is provided between the main welding contact 30 and the interlock switch 31. The purpose of this adjustment is to provide a manual means whereby the opening of switch 31 relative to the opening of welding contact 30 can be controlled. This may be done mechanically in several ways, however, in this embodiment there is indicated an elongated contact 32 with an adjustment member 34 (for example, a screw) to move the contact 32 up or down as desired. In the position shown, contact 30 and switch 31 open at the same time. As contact 32 is moved upwardly by adjustment member 34, contact 30 opens at progressively longer periods of time with respect to the opening of switch 31.

The time delay relay 23 is adapted to control a normally closed time delay switch 33. Conductors 35 and 36 serve to connect one side of the welding gun coil 14 to the one side 28 of the power source through relay switch 24. The other side of the welding gun coil 14 is connected to the other side 29 of the power source through a conductor 38. Conductors 40 and 41 serve to connect the first side 28 of the power source to the gun chuck 16 through the main welding contact 30. The chuck being metal serves to electrically connect power source to the stud 17. Another conductor 43 serves to electrically connect the workpiece to the second side 29 of the power source. Conductors 45 and 46 serve to connect the interlock switch 31 to the conductor 36 between the switch 24 and the one side of the gun coil at one end and to the conductor 41 between the main welding contact 30 and the gun chuck 16 at the other end thereof. Conductors 48 and 49 serve to connect the first side 28 of the power source through switch 25 and a resistance 50 to the gun chuck. Conductors 52 and 53 connect one side of the time delay relay 23 to the first side 28 of the power source and a conductor 54 connects the other side of the time delay relay to the second side 29 of the power source. Conductors 55 and 56 connect the first side 28 of the power source to a first side of relay 22 through switch 27 and a conductor 57 connects the other side of the relay 22 to the second side 29 of the power source. Conductors 60 and 61 connect the first side 28 of the power source to a first side of relay 21 through the normally closed time delay switch 33 and normally open push button switch 63. A conductor 62 connects the other side of the relay 21 to the second side 29 of the power source. A conductor 65 electrically connects conductor 60 between the push button switch 63 and the normally closed time delay switch 33 to conductor 53 between the switch 26 and the time delay relay 23.

In operation, the electrical control circuit 12 is connected to the power source and the welding gun or device is connected to the electrical control circuit. The manually operable push button switch is usually more closely adjacent the welding gun than indicated in FIGURE 1 and upon closing this switch 63 the time delay relay 23 is energized by way of conductors 60, 65, 53 and 54 and at the same time, relay 21 is energized by way of conductors 60, 61 and 62 as well as normally closed time delay switch 33. Energization of relay 21 causes closing of switches 24, 25, 26 and 27, and even if the push button switch 63 is released by an operator during the welding cycle the time delay relay is maintained energized by way of conductors 52, 53 and 54 and switch 26 and the relay 21 is maintained energized by way of conductors 52, 65, 61 and 62 as well as switches 26 and 33.

Upon the closing of switch 24 the gun coil 14 is energized by way of conductors 35, 36 and 38 and the stud 17 starts to lift away from the workpiece. Switch 25 closes at the same time as switch 24 which causes a potential difference to be applied between the stud and the workpiece by way of conductors 48, 49, resistor 50 and conductor 43. This produces what is commonly referred to as a pilot arc which aids in establishing the subsequent main welding arc. Switch 27 closes at the same time as switches 24 and 25 and this causes energization of relay 22 through conductors 55, 56 and 57 and closing of the main welding contact 30 as well as the interlock switch 31 which is connected thereto. This causes the main welding current to be supplied from the first side of the power source 28 through the contact 30 to the stud by way of conductors 40 and 41.

This causes full welding current to be passed across the gap between the workpiece and the end of the stud which causes melting of the end of the stud and adjacent portion of the workpiece. When the time delay relay 23 times out, the normally closed time delay switch 33 opens. This causes de-energization of relay 21 which causes simultaneous opening of switches 24, 25, 26 and 27. Upon opening of switch 24 the power to the armature coil 14 through conductors 35 and 36 is shut off and normally the spring 18 would at this moment urge the chuck and the stud toward and into engagement with the workpiece. The coil is, however, maintained in an energized condition by means of current flow passing through conductors 40, 46, 45 and 36 and 38, and also contact 30 and switch 31. This in effect means (with the parts in the position shown in FIGURE 1) that the armature coil cannot be de-energized until the main welding current is shut off by opening of the main welding contact 30. Upon opening of switch 27 relay 22 is de-energized with subsequent opening of contact 30 and switch 31. Upon the opening of switch 30 the main welding current is shut off and opening of switch 31 causes de-energization of the armature coil. As the coil is de-energized, the spring 18 urges the stud which is carried by the chuck into engagement with the workpiece so that the end of the stud is in contact with the molten metal which subsequently hardens thereby providing a bond between the stud and the workpiece.

One of the large advantages of this circuit is that the main welding contact 30 is given a much greater life than normal since it closes with resistor 50 in the line and when it opens, the resistance in the circuit is provided by the spacing between the workpiece and the stud. It is possible by using the adjustment member 34 to move contact 32 upward from the position shown in FIGURE 1 to a point where switch 31 opens at such a time before contact 30 that coil 14 is de-energized and spring 18 urges stud 17 into engagement with workpiece 19 before contact 30 opens. It will be readily apparent to those skilled in the art that many adjustments intermediate these extremes may be accomplished.

As mentioned hereinabove, FIGURE 2 is similar in many respects to the circuit of FIGURE 1 and where no changes have been made the same reference numerals have been utilized to indicate similar parts. In this embodiment of the invention the interlock switch 31 of FIGURE 1, which is mechanically connected to and moved by relay 22 has been omitted from the circuit. The switch 31 has been replaced by a resistor or resistance means 70 and a manually operable switch 72 has been placed in the circuit in series with the resistor between conductors 45 and 46. The manually operable switch 72 is normally closed and is of the type when moved to open position remains in open position until manually moved to closed position. With the use of this circuit it is assured that with the manually operable switch 72 closed, it will be impossible for the stud 17 to be plunged into the workpiece until the main welding contact 30 has opened. This will be pointed out as follows in a detailed description of the operation of this circuit.

In order to initiate the welding cycle, as in the description of the operation of FIGURE 1, the manually operable push button switch 63 is moved to closed position by an operator which serves to energize the time delay relay 23 by way of conductors 60, 65, 53 and 54 and at the same time energizes relay 21 by way of conductors 60, 61 and 62. The time delay relay switch 33 is normally closed, when de-energized, and the time delay relay 23 construction is such that after it is energized by closing the switch 63 it takes a predetermined amount of time for the switch 33 to move from the closed position to the open position. The time delay relay 23 and the associated switch 33 as a unit has a built in provision whereby various time delays may be set to control the duration of the welding cycle. The welding cycle may be adjustably varied for example between 7/60 of a second to one second for stud sizes of 5/16 inch and 7/8 inch in diameter. Energization of relay 21 causes simultaneous closing of switches 24, 25, 26 and 27. The closing of switch 26 insures energization of relay 21 by way of conductors 52, 65, switch 33, conductors 61 and 62 even though manually operable switch 63 moves to open position which is normally the case because an operator of the device does not continuously keep his finger on the switch to keep it closed. Closing of switch 24 starts the energization of the gun coil 14 by way of conductors 36 and 38 and closing of switch 27 starts the energization of relay 22. The closing of switch 24 also establishes an electrical circuit by way of conductors 45, 46 and 41 and stud 17 to the workpiece 19 and a circuit is also established to the workpiece 19 by the closing of switch 25 by way of conductor 49 and resistor 50. It does not matter which of these two paths serves to establish the electrical circuit to the stud 17 and workpiece 19, however, it should be noted that electrically speaking the circuit is established immediately upon the closing of switches 24 and 25 which close at the same time as switches 26 and 27. It should be recognized because of inertia and the time necessary to build up the required magnetic field to actuate the coil of relay 22 and the gun coil 14 that these two are not actuated before an electrical circuit is established through the stud 17 and the workpiece 19 as hereinabove described. The relay 22 which serves to actuate the main welding contact 30 is much larger and has a greater inertia than the gun coil 14 and as a result it takes the contactor 30 longer to close, upon closing of switches 24 through 27 than it takes the gun coil 14 to lift the stud 17 from the workpiece 19. For the sake of example only, it might be pointed out in one design that the actuating time of the relay 22 was 17 milliseconds whereas the actuating time of the gun coil 14 was 5 to 7 milliseconds. In other words, upon the closing of switch 27 it required 17 milliseconds for closing of switch 30 whereas upon closing of switch 24, which closes at the same time as switch 27, it required 5 to 7 milliseconds for the stud 17 to retract its required welding distance from the workpiece 19 which required distance may be on the order of one-eighth of an inch.

As mentioned hereinabove, upon closing of the switches 24 through 27 an electrical circuit is established immediately between stud 17 and workpiece 19 and the next thing that happens, for example in 5 to 7 milliseconds, is the gun coil 14 lifts the stud 17 from the workpiece 19 and with this electrical circuit established a pilot arc is struck between the tip of stud 17 and workpiece 19. In the particular design mentioned, approximately 10 to 12 milliseconds later or a total of 17 milliseconds from the closing of switch 27, the main welding contactor 30 closes, causing the full welding current to pass from the power source through contact 30, line 41, and across the gap established between the end of the stud 17 and the workpiece 19.

When the welding cycle is completed switch 33 opens. This causes de-energization of the relay 21 with subsequent closing of switches 24 through 27 at the same time. This also returns switch 33 to its closed condition. It should be kept in mind at this time that according to the objects of the present invention, in many cases (although not in all cases) it is desirable that the stud 17 not be plunged into the workpiece 19 until after the main welding contactor has opened. This is accomplished by the present construction and is described as follows.

It would be normal because of the relative inertias between the gun coil 14 and the coil of relay 22 that the coil 14 would become de-energized and plunge the stud 17 into contact with the workpiece (in 5 to 7 milliseconds) before the relay 22 became de-energized so as to cause closing of the main welding contactor 30 (approximately 17 milliseconds). The end result would be that the stud would be plunged into contact with the workpiece while the main welding current was still applied. By the present construction and teachings it is possible to assure that the gun coil 14 will be energized and will keep the stud 17 in a retracted position until after the main welding contact 30 has opened. This is accomplished because upon opening of switches 24 through 27 the gun coil 14 would tend to be de-energized before the coil of relay 22. The gun coil is maintained energized by shunting part of the main welding current to the gun coil by way of conductor 46, resistor 70, switch 72, conductor 45 and conductor 36. Therefore, while the coil of relay 22 is becoming demagnetized, the gun coil is maintained in a magnetized condition and keeps the stud 17 retracted. When the main welding contact 30 opens, this also cuts off current flow to the gun coil and if its de-energization time is 5 to 7 milliseconds, it will then take 5 to 7 milliseconds before the stud 17 is plunged into the workpiece 19. This assures that with this construction the stud can always be plunged in what is referred to as a "cold" condition or after the main welding contact 30 has opened.

The provision of the manual switch 72 in the line enables an operator of the device to plunge the stud 17 in what may be referred to as a "hot" condition when desired, or in other words the stud 17 will come into contact with the workpiece 19 before the main welding current is shut off. The reason for this is that the circuit through the resistor 70 by way of conductors 45 and 46 is rendered inoperative and as a result when switches 24 through 27 close, the closing time of the gun coil 14 is less than the coil of the relay 22 and as a result the stud is plunged into contact with the workpiece 19 before the main welding contact 30 closes. This is what is referred to as plunging the stud while "hot" which is desirable in some circumstances.

The same closing and opening times with regard to the relay 22 and gun coil 14 is true in the device of FIGURE 1 as well as in the device of FIGURE 2. As a result, in FIGURE 1 closing of main welding contactor 30 and switch 31 occurs on the order of 17 milliseconds after closing of contacts 24 through 27. The closing of switch 25 establishes electrically a circuit between stud 17 and workpiece 19 by way of conductor 49 and resistor 50. The time, for example, necessary to energize the gun coil 14 sufficiently to lift the stud 17 as stated above might be on the order of 5 to 7 milliseconds and as a result a pilot arc is established between stud 17 and workpiece 19. Upon closing of the contacts 24 through 27 in FIGURE 1, the normal sequence, because of the relative inertias between the gun coil 14 and the relay 22, would be to have the stud plunged before the main welding contactor 30 closed. However, a portion of the main welding current passing through the main welding contact 30 is fed back through conductor 46, switch 31, conductor 45 and conductor 36 to the gun coil 14 to maintain the stud in a retracted position. As a result, with contact 32 in the position shown in FIGURE 1, the main weld contact 30 and switch 31 open at the same time. If this be the case, then the main welding current is shut off at the same time the gun coil 14 starts to become de-energized which means that the stud will be plunged on the order of 5 to 7 milliseconds after the main welding current is interrupted. By moving the contact 32 upwardly by means of the adjustment member 34, it is possible to adjust the opening of switch 31 relative to the main welding contactor 30 to a point where the stud 17 is plunged into the workpiece 19 while the main welding contact 30 is still closed and as a result the stud plunges "hot." The circuit in both FIGURES 1 and 2 which bypasses or shuts (after closing of switches 24 through 27) a portion of the main welding current passing through contactor 30 to the coil 14 to keep the coil energized until after closing of contactor 30, may be referred to as interlock circuit means for assuring energization of said coil until after closing of said main welding contactor.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for welding a stud to a workpiece including in combination a chuck adapted to hold a stud, an armature core operatively connected to said chuck, a spring constantly urging a stud carried by said chuck into engagement with a workpiece, a coil around said armature core for moving said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a second switch, fifth conductor means connecting one side of said second switch to said first conductor means between said first switch and said one side of said coil and the other side of said second switch to said third conductor means between said main welding contactor and said chuck, mechanical means connecting said main welding contactor and said second switch together whereby closing of one causes closing of the other, a third switch, sixth conductor means connecting one side of said third switch to said one side of said power source and the other side to said chuck through a resistance, mechanical means connecting said first and third switches together to energize said coil to lift said chuck and a stud and establish a pilot arc between the stud and workpiece, means actuated subsequently to close said main welding contactor and said second switch to establish full welding current between the stud and the workpiece, and timer means subsequently causing opening of said first and third switches and deactuation of said means actuated subsequently to open said main welding contactor and said second switch, with said second switch assuring that said coil remains energized and the stud remains away from the workpiece until said main welding contactor opens.

2. Apparatus for welding a stud to a workpiece including in combination a chuck adapted to hold a stud, an armature core operatively connected to said chuck, a spring constantly urging a stud carried by said chuck into engagement with a workpiece, a coil around said armature core for moving said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a second switch, fifth conductor means connecting one side of said second switch to said first conductor means between said first switch and said one side of said coil and the other side of said second switch to said third conductor means between said main welding contactor and said chuck, mechanical means connecting said main welding contactor and said second switch together whereby closing of one causes closing of the other, a third switch, sixth conductor means connecting one side of said switch to said one side of said power source and the other side to said chuck through a resistance, mechanical means connecting said first and third switches together to energize said coil to lift said chuck and a stud and establish a pilot arc between the stud and workpiece, means actuated subsequently to close said main welding contactor and said second switch to establish full welding current between the stud and the workpiece, timer means subsequently causing opening of said first and third switches and deactuation of said means actuated subsequently to open said main welding contactor and said second switch, and adjustable mechanical means for changing the relative opening between said main welding contactor and said second switch.

3. Apparatus for welding a stud to a workpiece including in combination a chuck adapted to hold a stud, an armature core operatively connected to said chuck, a spring constantly urging a stud carried by said chuck into engagement with a workpiece, a coil around said armature core for moving said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a second switch, fifth conductor means connecting one side of said second switch to said first conductor means between said first switch and said one side of said coil and the other side of said second switch to said third conductor means between said main welding contactor and said chuck, mechanical means connecting said main welding contactor and said second switch together whereby closing of one causes closing of the other, means actuated subsequently to close said main welding contactor and said second switch to establish full welding current between the stud and the workpiece, the timer means subsequently causing opening of said first switch and deactuation of said means actuated subsequently to open said main welding contactor and said second switch with said second switch assuring that said coil remains energized and the stud remains away from the workpiece until said main welding contactor opens.

4. Apparatus for welding a stud to a workpiece including in combination a chuck adapted to hold a stud, an armature core operatively connected to said chuck, a spring constantly urging a stud carried by said chuck into engagement with a workpiece, a coil around said armature core for moving said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a second switch, fifth conductor means connecting one side of said second switch to said first conductor means between said first switch and said one side of said coil and the other side of said second switch to said third conductor means between said main welding contactor and said chuck, mechanical means connecting said main welding contactor and said second switch together whereby closing of one causes closing of the other, means actuated subsequently to close said main welding contactor and said second switch to establish full welding current between the stud and the workpiece, timer means subsequently causing opening of said first switch and deactuation of said means actuated subsequently to open said main welding contactor and said second switch, and adjustable mechanical means for changing the relative opening between said main welding contactor and said second switch.

5. Apparatus for welding a stud to a workpiece including in combination a chuck adapted to hold a stud, an armature core operatively connected to said chuck, means urging a stud carried by said chuck into engagement with a workpiece, a coil for moving said core and said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a second switch, fifth conductor means connecting one side of said second switch to said first conductor means between said first switch and said one side of said coil and the other side of said second switch to said third conductor means between said main welding contactor and said chuck, and mechanical means connecting said main welding contactor and said second switch together whereby closing of one causes closing of the other.

6. Apparatus for welding a stud to a workpiece including in combination a chuck adapted to hold a stud, an armature core operatively connected to said chuck, means urging a stud carried by said chuck into engagement with a workpiece, a coil for moving said core and said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a second switch, fifth conductor means connecting one side of said second switch to said first conductor means between said first switch and said one side of said coil and the other side of said second switch to said third conductor means between said main welding contactor and said chuck, mechanical means connecting said main welding contactor and said second switch together whereby closing of one causes closing of the other, and adjustable mechanical means for changing the relative opening between said main welding contactor and said second switch.

7. Apparatus for welding a stud to a workpiece including in combination a chuck adapted to hold a stud, an armature core operatively connected to said chuck, a spring constantly urging a stud carried by said chuck into engagement with a workpiece, a coil around said armature core for moving said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a resistance, fifth conductor means connecting one side of said resistance to said first conductor means between said first switch and said one side of said coil and the other side of said resistance to said third conductor means between said main welding contactor and said chuck, another switch, sixth conductor means connecting one side of said another switch to said one side of said power source and the other side to said chuck through another resistance, mechanical means connecting said first and said another switch together to energize said coil to lift said chuck and a stud and establish a pilot arc between the stud and workpiece, means actuated subsequently to close said main welding contactor to establish full welding current between the stud and the workpiece, and timer means subsequently causing opening of said first and said another switch and de-actuation of said means actuated subsequently to open said main welding contactor with said resistance and said fifth conductor means assuring that said coil remains energized and the stud remains away from the workpiece until said main welding contactor opens.

8. Apparatus for welding a stud to a workpiece including in combination a chuck adapted to hold a stud, an armature core operatively connected to said chuck, a spring constantly urging a stud carried by said chuck into engagement with a workpiece, a coil around said armature core for moving said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a resistance, fifth conductor means connecting one side of said resistance to said first conductor means between said first switch and said one side of said coil and the other side of said resistance to said third conductor means between said main welding contactor and said chuck, a manually operable switch in said fifth conductor means for opening and closing the same when desired, another switch, sixth conductor means connecting one side of said another switch to said one side of said power source and the other side to said chuck through another resistance, mechanical means connecting said first and said another switch together to energize said coil to lift said chuck and a stud and establish a pilot arc between the stud and workpiece, means actuated subsequently to close said main welding contactor to establish full welding current between the stud and the workpiece, and timer means subsequently causing opening of said first and said another switch and de-actuation of said means actuated subsequently to open said main welding contactor with said resistance and said fifth conductor means assuring that said coil remains energized and the stud remains away from the work piece until said main welding contactor opens in the closed position of said manually operable switch.

9. Apparatus for welding a stud to a workpiece including in combination a chuck adapted to hold a stud, an armature core operatively connected to said chuck, means for urging a stud carried by said chuck into engagement with a workpiece, a coil around said armature core for moving said chuck with a stud therein away from the workpiece, an electrical power source, a first switch and first conductor means connecting one side of said coil to one side of said power source, second conductor means connecting the other side of said coil to the other side of said power source, a main welding contactor and third conductor means connecting said one side of said power source to said chuck and the stud, fourth conductor means connecting the workpiece to said other side of said power source, a resistance means, fifth conductor means connecting one side of said resistance means to said first conductor means between said first switch and said one side of said coil and the other side of said resistance means to said third conductor means between said main welding contactor and said chuck, means for closing said main welding contactor to establish full welding current between the stud and the workpiece, and timer means subsequently causing opening of said main welding contactor with said resistance means and said fifth conductor means shunting a portion of the welding current to said coil thus assuring that said coil remains energized and the stud remains away from the workpiece until said main welding contactor opens.

10. Welding circuit means for controlling the position of a weldable member relative to a workpiece which weldable member is moved in accordance with the movement of core means including in combination a coil for moving said core means, first conductor means connecting said coil means across a power source, a main welding contactor, second conductor means connecting a workpiece to the power source through said main welding contactor, a relay contactor coil controlling said main welding contactor, third conductor means connecting said relay contactor coil across the power source, the inertia of said relay contactor coil being greater than that of said coil which moves the core means, switch means for energizing and de-energizing said first and third conductor means and as a result said coil and said relay contactor coil, opening of said switch means shutting off power to said coil and said relay contactor coil with resultant normal de-energization of said coil and movement of the core means and workpiece before de-energization of said relay contactor coil and closing of said main welding contactor because of the greater inertia of said relay contactor coil, and interlock circuit means for by-passing a portion of the power from said second conductor means to said coil to assure energization of said coil until after closing of said main welding contactor.

11. Welding circuit means for controlling the position of a weldable member relative to a workpiece which weldable member is moved in accordance with the movement of core means including in combination a coil for moving said core means, first conductor means connecting said coil means across a power source, a main welding contactor, second conductor means connecting a workpiece to the power source through said main welding contactor, a relay contactor coil controlling said main welding contactor, third conductor means connecting said relay contactor coil across the power source, means for energizing and de-energizing said first and third conductor means and as a result said coil and said relay contactor coil, de-energization of said coil and said relay contactor coil resulting in normal movement of the core means and workpiece before closing of said main welding contactor, and interlock circuit means for assuring energization of said coil until after closing of said main welding contactor.

12. Welding apparatus including in combination, a core, a single coil upon energization thereof moving said core in a first direction, means urging said core in a second direction, a chuck carried by said core, first electrical circuit means including a first switch and said single coil connected across a power source for actuating said core, second electrical circuit means including a main welding contactor and said chuck adapted to carry a metal member relative to a workpiece connectable across said power source depending upon the condition of said single coil, third electrical circuit means connected at one end to said first electrical circuit means between said first switch and said single coil and at the other end to said second electrical circuit means between said main welding contactor and said chuck thereby assuring energization of said single coil for a period of time after opening of said first switch and until opening of said main welding contactor.

13. Welding apparatus as claimed in claim 12 wherein said third electrical circuit means includes resistance means and a manually operable switch movable between open and closed positions.

14. Welding apparatus as claimed in claim 12 wherein said third electrical circuit means includes a second switch mechanically connected to said main welding contactor and movable between open and closed positions therewith.

15. Welding apparatus as claimed in claim 14 wherein adjustable means are provided between said main welding contactor and said second switch whereby the relative opening of the same may be adjusted to adjust the relative time of de-energization of said coil and opening of said main welding contactor.

References Cited

UNITED STATES PATENTS

| | | | |
|---|---|---|---|
| 2,847,557 | 8/1958 | English | 219—98 |
| 2,932,725 | 4/1960 | Ainsworth et al. | 219—98 |
| 3,064,119 | 11/1962 | Glorioso | 219—98 |
| 3,100,833 | 8/1963 | Ritter et al. | 219—98 |

RICHARD M. WOOD, *Primary Examiner.*

R. F. STAUBLY, *Assistant Examiner.*